United States Patent
Waidhofer et al.

(10) Patent No.: US 9,983,833 B2
(45) Date of Patent: May 29, 2018

(54) SOLID STATE DRIVE WITH HOLDING FILE FOR ATOMIC UPDATES

(71) Applicant: Toshiba Memory Corporation, Minato-ku, Tokyo (JP)

(72) Inventors: Gordon W. Waidhofer, Irvine, CA (US); Ali Aiouaz, San Jose, CA (US); Christopher S. Delaney, Orange, CA (US); Leland W. Thompson, Tustin, CA (US)

(73) Assignee: Toshiba Memory Corporation, Tokyo (JP)

( * ) Notice: Subject to any disclaimer, the term of this patent is extended or adjusted under 35 U.S.C. 154(b) by 350 days.

(21) Appl. No.: 14/757,468

(22) Filed: Dec. 23, 2015

(65) Prior Publication Data

US 2017/0185350 A1    Jun. 29, 2017

(51) Int. Cl.
*G06F 3/06* (2006.01)
*G06F 11/14* (2006.01)

(52) U.S. Cl.
CPC .......... *G06F 3/0679* (2013.01); *G06F 3/0619* (2013.01); *G06F 3/0643* (2013.01); *G06F 11/1451* (2013.01); *G06F 11/1469* (2013.01); *G06F 2201/805* (2013.01)

(58) Field of Classification Search
CPC ..... G06F 3/0679; G06F 3/0619; G06F 3/0643
USPC ........... 711/103, 118, 154, 156; 365/185.33; 713/2
See application file for complete search history.

(56) References Cited

U.S. PATENT DOCUMENTS

| | | | |
|---|---|---|---|
| 9,143,583 B1 * | 9/2015 | Brockway | H04L 69/08 |
| 9,558,086 B2 * | 1/2017 | Huang | G06F 11/221 |
| 9,672,245 B2 * | 6/2017 | Lee | G06F 17/30377 |
| 9,846,617 B2 * | 12/2017 | Rahardjo | G06F 11/1417 |
| 2008/0278508 A1 * | 11/2008 | Anderson | G06F 3/1462 345/519 |
| 2009/0125709 A1 * | 5/2009 | Martinez | G06F 9/4416 713/2 |
| 2015/0019792 A1 * | 1/2015 | Swanson | G06F 9/466 711/102 |
| 2017/0085685 A1 * | 3/2017 | Brockway | H04L 69/24 |
| 2017/0318132 A9 * | 11/2017 | Brockway | H04L 69/22 |

* cited by examiner

*Primary Examiner* — Stephen Elmore
(74) *Attorney, Agent, or Firm* — White & Case LLP

(57) ABSTRACT

A method of updating a file in a solid state drive (SSD) and an SSD configured to update a file in the SSD is disclosed. In one embodiment, the method includes performing one or more writes to a holding file in an auxiliary memory, the one or more writes corresponding to an update for a target file in the auxiliary memory. The method further includes applying the update to the target file in the auxiliary memory when each of the one or more writes has been successfully written to the holding file, and resetting the holding file when less than all of the one or more writes have been successfully written to the holding file. In one embodiment, a flash controller in communication with the auxiliary memory performs the update.

20 Claims, 14 Drawing Sheets

SOLID STATE DRIVE WITH HOLDING FILE FOR ATOMIC UPDATES

FIELD OF THE INVENTION

This invention is generally related to atomic updates for a solid state drive (SSD).

BACKGROUND OF THE INVENTION

A solid state drive (SSD) may include a flash memory, flash memory controller, and an auxiliary local memory to store boot code and configuration data for the flash memory controller. This auxiliary memory may be implemented as a serial peripheral interface (SPI) flash memory of the SSD. However, storing boot code and configuration data in an auxiliary local memory means that there is a potential window of vulnerability if a power failure or other failure event occurs in the middle of an update.

Unfortunately, many conventional approaches used to safeguard updates in rewritable disk storage cannot be applied to a flash memory controller environment having an SPI flash as the auxiliary memory. This is due to the flash controller's limited computational resources. Additionally, the auxiliary memory imposes various physical limitations. For example, if the auxiliary memory is an SPI flash device, the coarse-grained erase-write characteristics of the SPI flash device limits the options to safeguard an update from a power failure or other failure event. Consequently, many of the techniques used to provide safeguards during an update process are unsuitable for coarse-grained erase-write flash storage or are otherwise incompatible with the resource constrained environment of an SSD.

There is, therefore, an unmet demand for SSDs with safeguards for updating files in an auxiliary memory in the event of a power failure or other failure event.

BRIEF DESCRIPTION OF THE INVENTION

In one embodiment, an SSD includes a flash controller, a flash memory array in communication with the flash controller, and an auxiliary memory in communication with the flash controller, and from which the flash controller is configured to access files stored in the auxiliary memory. In one embodiment, the SSD is configured to update a file in a pending state in the auxiliary memory and access a resulting updated file only when the update has been completed. In one embodiment, the flash controller is configured to update files in the auxiliary memory.

In one embodiment, an update comprises one or more writes to a holding file in the auxiliary memory. In another embodiment, the SSD is configured to apply the update to a target file to be updated in the auxiliary memory when each of the one or more writes has been written to the holding file, and to reset the holding file when less than all of the sequence of one or more writes have been written to the holding file. In one embodiment, the auxiliary memory is coarse-grained. In one embodiment, the auxiliary memory comprises a SPI flash memory. In one embodiment, the one or more writes to the holding file are coarse-grained. In another embodiment, each of the one or more writes comprises at least 100 bytes.

In one embodiment, a method of updating a file in an SSD includes performing one or more writes to a holding file in an auxiliary memory, the one or more writes corresponding to an update for a target file in the auxiliary memory. The method further includes applying the update to the target file in the auxiliary memory when each of the one or more writes has been successfully written to the holding file, and resetting the holding file when less than all of the one or more writes have been successfully written to the holding file. In one embodiment, a flash controller in communication with the auxiliary memory performs the one or more writes corresponding to the update for the target file in the auxiliary memory, applies the update to the target file when each of the one or more writes has been written successfully to the holding file, and resets the holding file when less than all of the one or more writes have been successfully written to the holding file.

In one embodiment, the method further includes resetting the holding file prior to performing the one or more writes corresponding to the update for the target file in the auxiliary memory. In one embodiment, the method further includes updating a journal with a new journal entry after each successful write of the one or more writes to the holding file, the new journal entry recording the preceding successful write to the holding file. In one embodiment, the method further includes updating an entry in a file system table comprising an up-to-date record of files stored in the auxiliary memory after each new journal entry, the entry in the file system recording the preceding successful write to the holding file.

In one embodiment, the method further includes updating the journal with a commit entry after each of the one or more writes to the holding file has been successfully written to the holding file, and updating the file system table entries recording the one or more writes to the holding file to the target file. In one embodiment, the method further includes reallocating the auxiliary memory after the update to the target file is applied. In one embodiment, reallocating the auxiliary memory includes traversing one or more sectors of the auxiliary memory and erasing the sectors that correspond to the entries in the file system table that are blank. In one embodiment, the auxiliary memory is reallocated when the auxiliary memory is not being written to or read from.

In one embodiment, the auxiliary memory is coarse-grained. In one embodiment, the auxiliary memory comprises an SPI flash memory. In one embodiment, the one or more writes to the holding file are coarse-grained. In another embodiment, each of the one or more writes comprises at least 100 bytes.

DETAILED DESCRIPTION OF THE INVENTION

Figure 1:
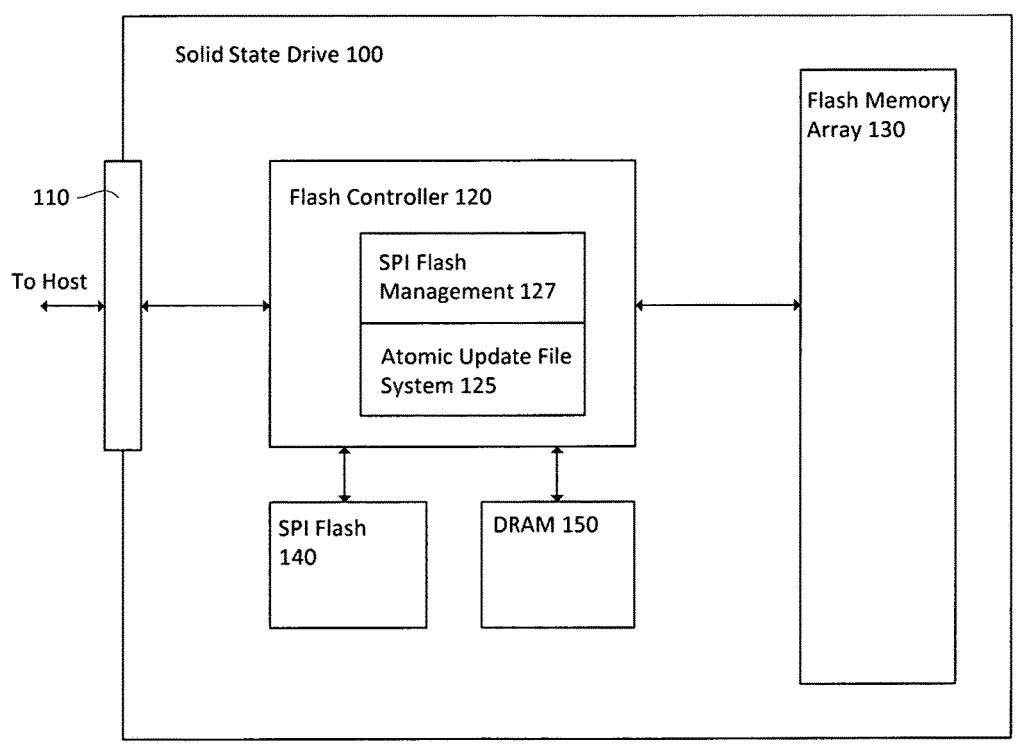
FIG. 1 is a block diagram of the structure of an SSD, according to one embodiment of the invention.

FIG. 1 shows a block diagram of the structure of an SSD 100, according to one embodiment of the invention. In FIG. 1, the SSD 100 is connected to a host device (not shown) via a host interface 110. The host device may be any suitable device, such as a computer. A flash controller 120 is connected to a NAND flash memory array 130, a Serial Peripheral Interface (SPI) flash 140, and a volatile memory DRAM 150. The flash controller 120 relies on an auxiliary memory, such as SPI flash 140, to store firmware and data necessary to boot the flash controller 120 as well as to store other data and critical parameters persistently, independent of the NAND flash memory array 130.

In one embodiment, the flash controller 120 is an application specific integrated circuit (ASIC) with on-chip processors, ROM, and RAM. The SPI flash 140 contains firmware and configuration data necessary to boot the flash controller device 120. The use of the SPI flash 140 for storing firmware and configuration data improves reliability compared to storing the booting and configuration data in the NAND flash memory array 130. This is because booting from SPI flash 140 improves the chances of recovery, failure analysis, and salvage of the SSD 100 in the event the NAND flash memory array 130 is inaccessible.

In one embodiment, the SPI flash 140 stores the secondary boot loader code (the primary boot loader code is in on-chip ROM on the flash controller 120 and is responsible for loading and transferring control to the secondary boot loader code from the SPI flash 140). In another embodiment, the SPI flash 140 stores the primary firmware for the flash controller 120 (the primary firmware being the bulk of the device software and subsystems which run and control the flash controller 120 once it has booted up). In other embodiments, the SPI flash 140 may also store critical parameters (such as the DRAM 150 timing parameters, serial number, and the like), option ROM (also known as expansion ROM, BIOS or UEFI firmware), and Bad Block Lists (BBL) (being the blocks of the NAND flash memory array 130 in the SSD 100 which are no longer functional).

In addition to the SPI flash 140 acting as a ROM for the purposes of initial booting and starting of the flash controller 120, data (typically in the form of updates) are also periodically written to the SPI flash 140. As an illustrative example, in one embodiment, updates may be written to the SPI flash 140 to upgrade all firmware components. In other embodiments, the SPI flash 140 may be updated with the Grown Bad Block List (GBBL) and persistent data, such as accumulated power-on time, manufacturing configuration data, and results.

The structure of SPI flash 140 differs from the NAND flash memory array 130 used for general data storage in that it has a serial interface (rather than parallel in the case of the NAND flash memory array 130), and an SPI flash 140 typically uses NOR technology (rather than NAND) and provides a much smaller address space (measured in MB rather than the 100s of GB provided by the NAND flash memory array 130 comprising multiple NAND flash devices on multiple interface channels). The use of the SPI flash 140 for firmware and storing other critical parameters and data (such as the Bad Lock Lists) means that the SSD 100 is more resistant and reliable than one where such data is stored in the NAND flash memory array 130. Otherwise, if there are any problems or failures within the NAND flash memory array 130, the flash controller 120 may not be able to boot. As such, booting from SPI flash 140 and storing critical parameters and data in the SPI flash 140 improves the chances of recovery, failure analysis, and salvage of the SSD 100 even if the NAND flash memory array 130 is inaccessible.

However, using SPI flash 140 to store and update critical parameters and data also presents its own difficulties. An update to SPI flash 140 is "coarse-grained" in that it is written in blocks of hundreds or thousands of bytes. In turn, coarse-grained also means that values (bytes) cannot be changed individually. Moreover, flash memory generally does not allow data to be rewritten, and instead, requires the old data to be erased first before new data can be written (also referred to as erase-write). In the SPI flash 140, the minimum erase-write step may be on the order of at least a hundred bytes or a thousand bytes, depending on implementation details for the coarse-grained memory. Additionally, an update to the configuration data of the SPI flash 140 may require more than one physical write operation.

As an example, in one embodiment, a SPI flash memory 140 may have a minimum erase size of 4 KB and a maximum write size of 256 bytes. The minimum erase size of the SPI flash memory 140 is also known as a "sector." Typically, flash writes are smaller than a sector. For example, suppose the file sector is 4 KB, but only 256 B can be written at one time due to internal flash chip buffering limits. In this example, a file sector write requires 16 writes to the SPI flash 140. All of these write operations for an update take time, during which the integrity of the file content and metadata structures is at risk. Thus, if a sequence of writes for an update to the SPI flash 140 is interrupted by a power failure or other failure event, then the update process may stop midway through the update. Partially updated firmware or critical parameters in the SPI flash 140 may cause the flash controller 120 to not be able to boot or function properly after power to the SSD 100 is restored, or when the failure event is resolved.

In one embodiment, the SSD 100 includes an atomic update file system 125 and associated file system tables to manage atomic updates to a file in the SPI flash 140 containing the information utilized to boot up the flash controller 120. In one embodiment, the atomic update file system 125 may be part of a larger SPI flash management unit 127 providing processing support from the flash controller 120 for the atomic update file system 125 to perform atomic updates of the SPI flash 140. The atomic update file system 125 is internal to the SSD 100, operates using the local processing resources of the SSD 100, and typically is invisible to the host device. It is also separate from and independent of any file system used by the host computer to access the SSD. The atomic file system 125 allocates sectors in the SPI flash memory 140 and manages file system tables to perform updates. The atomic update file system 125 may reside in the flash controller 120. In other embodiments, the atomic update file system 125 may have its functionality implemented on the SSD 100 as a separate component or in different locations than the flash controller 120.

The updates to the SPI flash 140 are atomic in that they satisfy the criteria for atomicity. In an atomic transaction, a series of operations are indivisible. The series of operations either all occur, or nothing occurs. An atomic write of an update is a write that will either return a pass or fail status to the flash controller 120. Thus, the atomic update file system 125 provides the ability to write data updates atomically to a coarse-grained memory such as SPI flash 140, even under conditions where the size of the update means that multiple writes are required. This atomic write requirement covers any size of data package to be written in an update, which means that an amount of data which requires more than one physical write operation to the memory device requires special handling. If the sequence of multiple writes for a given update was disrupted, by a power failure or other failure event, the operation of the update as a whole needs to fail, even though several individual write operations of portions of the update may have been written successfully. In the event of an error or power loss, the file in the SPI flash 140 will be exactly as it was or it will have the entire update.

In one embodiment, the atomic update file system 125 may allocate sectors for a holding file in the SPI flash memory 140. Updates may be initially written to the holding file in the SPI flash memory 140 and recorded as journal entries. After a restart, journal entries satisfying the atomicity requirement may be accepted and in a single operation, the sectors from the holding file are moved to the target file, and the stale sectors are released. Thus, the holding file allows for even the largest atomic updates to be committed to the SPI flash 140 in one step, after the journal entries confirm that the write(s) to the holding file in the SPI flash memory 140 have been successful, thereby safeguarding against any errors that might have occurred during the update process.

Figure 2:
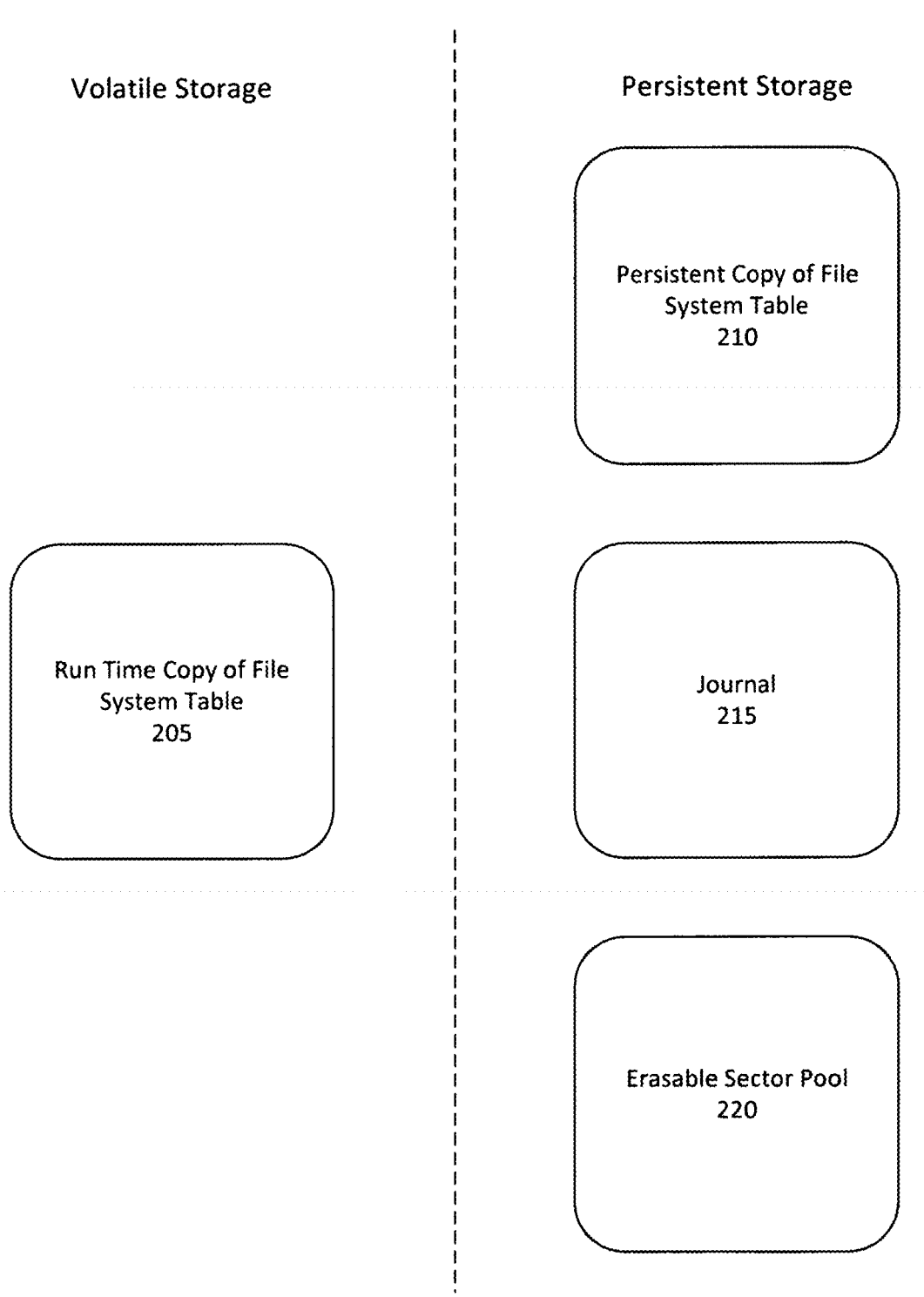
FIG. 2 shows various data structures of a file system for performing atomic updates, according to one embodiment of the invention.

FIG. 2 shows various data structures of a file system for performing atomic updates, according to one embodiment of the invention. As illustrated in FIG. 2, in one embodiment, the atomic update file system has four main data structures: a run-time, current copy of a file system table 205 in volatile storage (such as the DRAM); a persistent copy of the file system table 210 in persistent storage (such as the SPI flash); a journal 215 comprising journal entries may be incrementally appended, but not rewritten; and an erasable sector pool 220 in persistent storage that holds file content in persistent storage. The current copy of a file system table 205 and the persistent copy of the file system table 210 stores the relationship between the physical sectors of the erasable sector pool 220, the file name, and a logical sector of the file stored in a given physical sector of the erasable sector pool 220. Each journal entry of the Journal 215 represents an incremental update to a file stored in one or more sectors of the erasable sector pool 220. The structure and operation of the data structures in the atomic update file system shown and described in FIGS. 1 and 2 is explained in further detail in connection with FIGS. 3-7, below.

Figure 3:
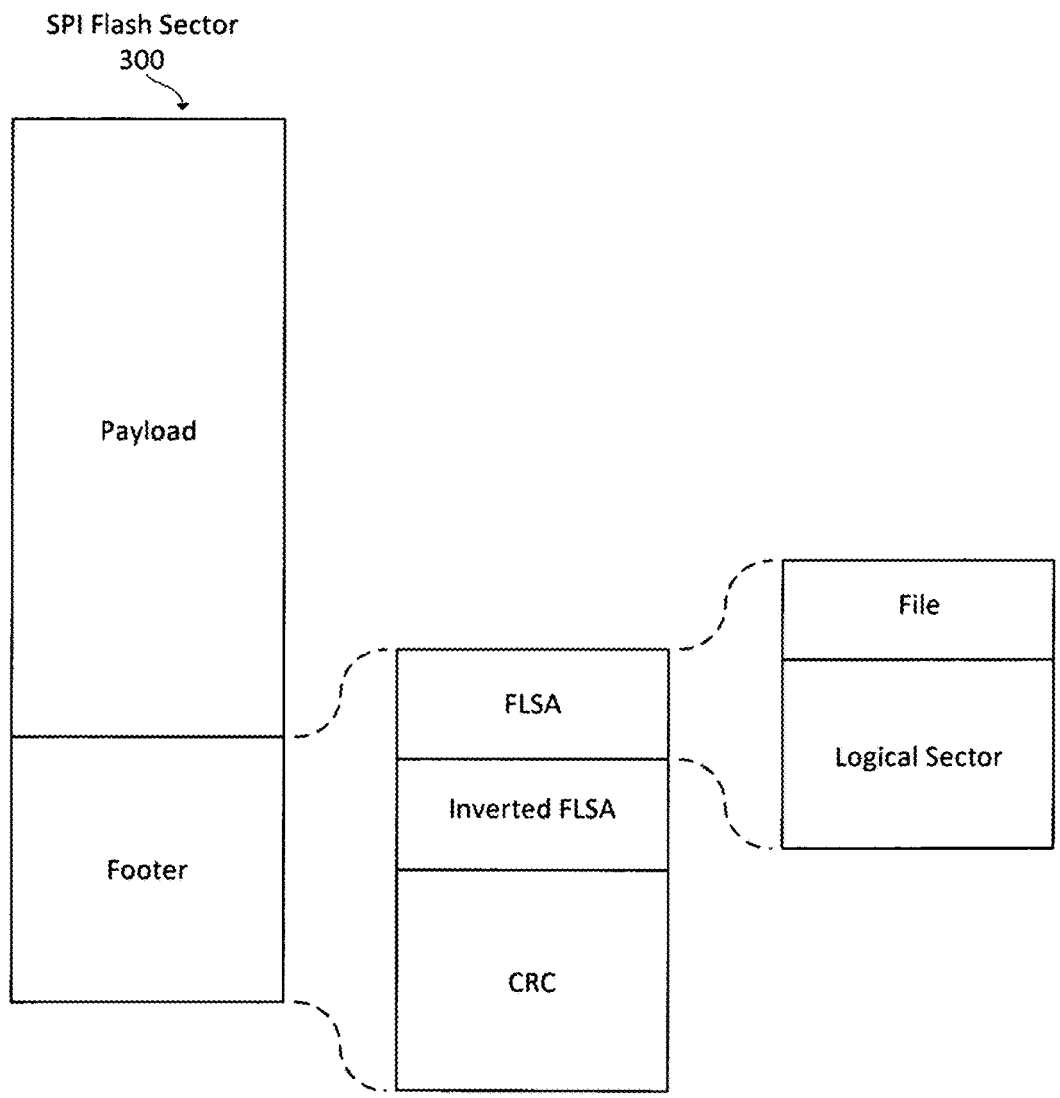
FIG. 3 is a block diagram of the structure of an SPI flash sector, according to one embodiment of the invention.

FIG. 3 is a block diagram of the structure of an SPI flash sector 300, according to one embodiment of the invention. As previously discussed, a basic unit of the SPI flash is a sector, which corresponds to the smallest unit of storage which will be erased in the SPI flash before any data is written. For example, in one embodiment, the SPI flash comprises an 8 MB NOR flash. Typically, the minimum erasure unit for an 8 MB NOR flash is 4 KB, and as such, each SPI flash sector 300 is 4 KB. To assure data integrity, each SPI flash sector 300 has an 8-byte footer (leaving 4088 bytes for the payload, such as the update file data). The 8-byte footer includes a file sector footer including the file logical sector address (FLSA) (plus this information in inverted form), and a 32-bit CRC cyclic redundancy check. The FLSA in turn contains a 5-bit file name and an 11-bit logical sector address. In other embodiments, depending on the size and type of the SPI flash, SPI flash sector 300 may be larger or smaller in capacity than 4 KB, which in turn, will have correspondingly varying sizes for the payload and footer.

In operation, when an SPI flash sector 300 is read, the integrity of the SPI flash sector 300 is checked by recalculating the 32-bit CRC value and comparing to the value stored in the footer. If an error is detected, the transfer is re-tried because the problem may have been the transfer and not the content. When an SPI flash sector 300 is written, the 8-byte footer is calculated just before writing to the SPI flash sector 300. After the write, the integrity is checked by comparing (reading back) what was written. If there is an error, the SPI flash sector 300 may be erased and the write retried.

Figure 4:
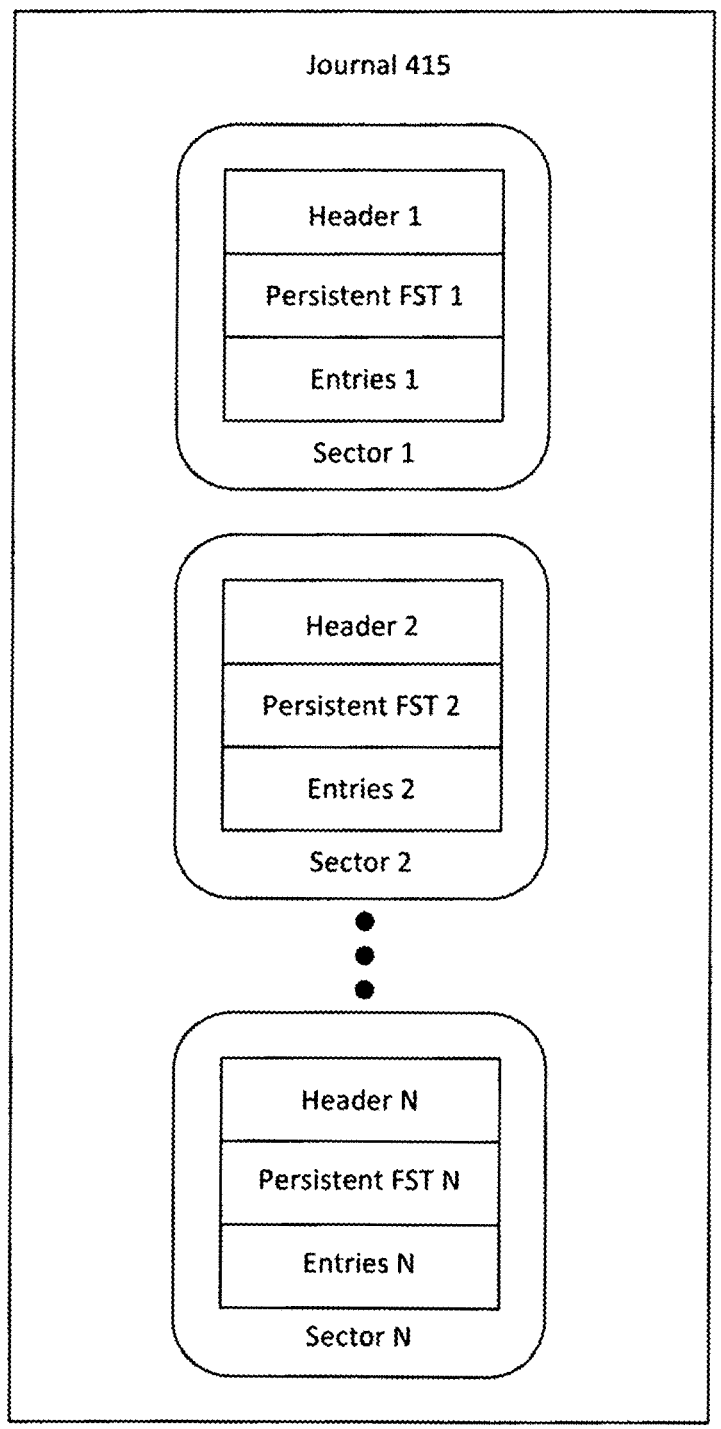
FIG. 4 is a block diagram of the structure of a journal, according to one embodiment of the invention.

FIG. 4 shows a block diagram of the structure of a journal 415, according to one embodiment of the invention. As shown in FIG. 4, the journal 415 occupies a plurality of sectors 1-N within the SPI flash. In one embodiment, each journal sector 1-N comprises a header 1-N, a persistent copy of the file system table (FST) 1-N, and journal entries 1-N, respectively. Each journal entry 1-N contains incremental updates to the respective persistent FST 1-N. For example, at the time journal sector 1 is created, persistent FST 1 is written first, followed by header 1. If both the persistent FST 1 and header 1 are written successfully, journal entries 1 may then be written to the journal sector 1. Once journal sector 1 is filled, journal sector 2 is created in a similar manner, and so on. Thus, persistent FST 1-N represents a checkpoint of the file system table for each given journal sector 1-N, prior to implementing the updates from the journal entries 1-N. In case of a power failure or other failure event, the state of the file system table prior to the failure event is preserved.

Figure 5:
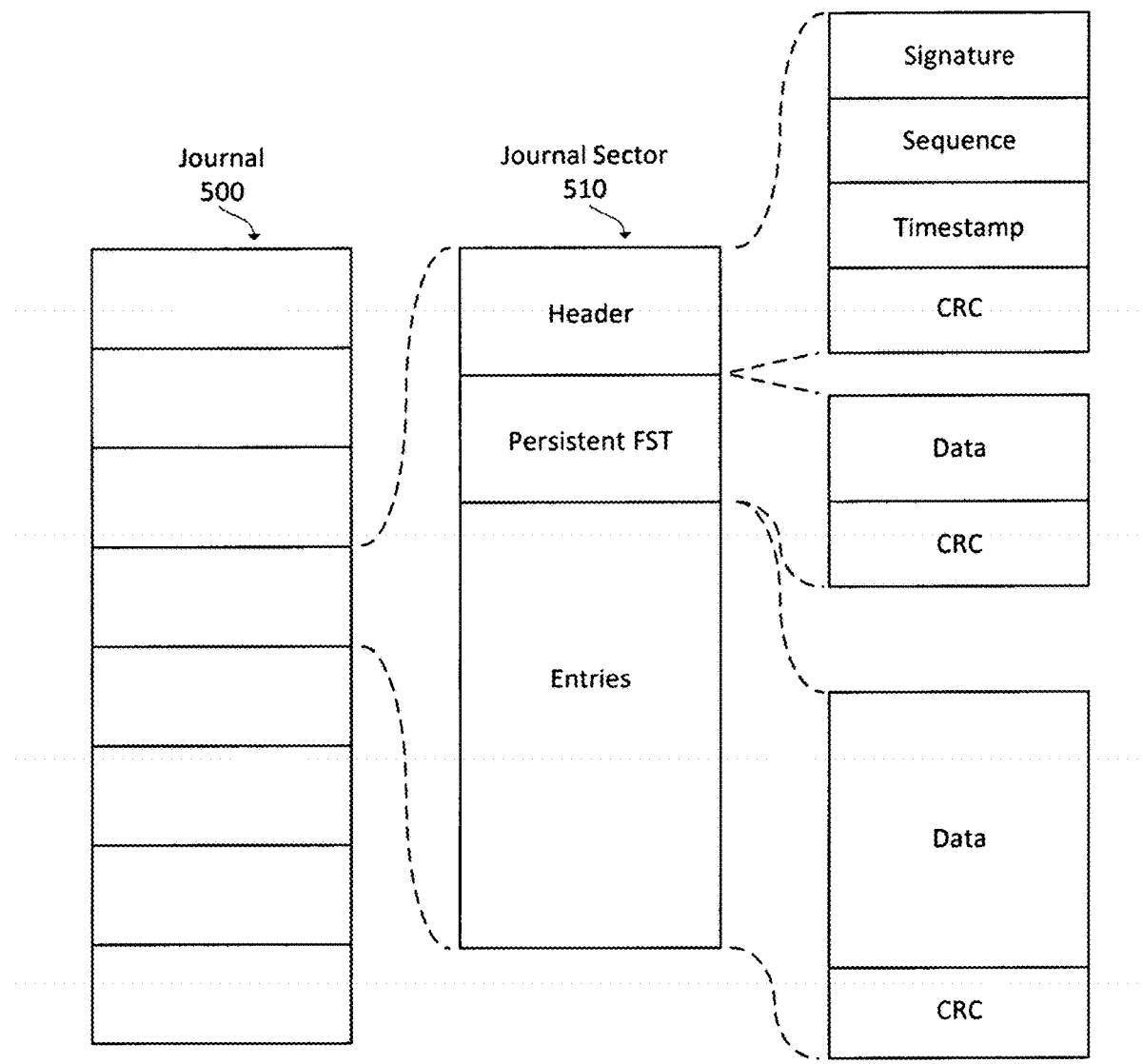
FIG. 5 is a block diagram of the structure of a journal sector, according to one embodiment of the invention.

FIG. 5 shows a block diagram of the structure of a journal sector 510, according to one embodiment of the invention. As shown in FIG. 5, a journal 500 comprises a plurality of journal sectors 510. While the journal 500 in FIG. 5 is represented as having eight journal sectors 510, in other embodiments, the journal 500 may have more or less than eight journal sectors 510 depending on the number of updates that have been applied to the firmware and other critical information in the SPI flash. In one embodiment, for example, the journal 500 is 32 KB and is written as eight 4 KB sectors.

As previously discussed in connection with FIG. 4, a journal sector 510 contains a header and a persistent copy of the FST which acts as a checkpoint. The persistent FST contains the maintained state as of when a journal sector 510 started. The persistent FST is followed by individual journal entries. Each journal entry contains incremental updates to the maintained state of the persistent FST. In one embodiment, the journal sector headers, the checkpoints, and the entries are protected by magic numbers (signatures) and CRCs. The header also contains a sequence number and a timestamp to help identify the position of a specific journal sector 510 relative to the to the other journal sectors given that the journal 500 is written sequentially.

In one embodiment, upon restart, the journal sectors of journal 500 are scanned to find the sector with a valid header and the latest (highest) sequence number. A relatively modest number of bits for the sequence number will be sufficient to support atomic updates over the life of the solid state drive. As an example, the sequence number may have 32 bits. Assuming the sequence number has 32 bits and that there was one new journal sector created per second, this provides a service life of 130 years. However, more realistically, minutes, hours, even months may pass between journal sectors being created/updated such that very modest numbers of sequence bits are required to support atomic updates over the lifetime of an SSD under normal operating conditions.

Figure 6:
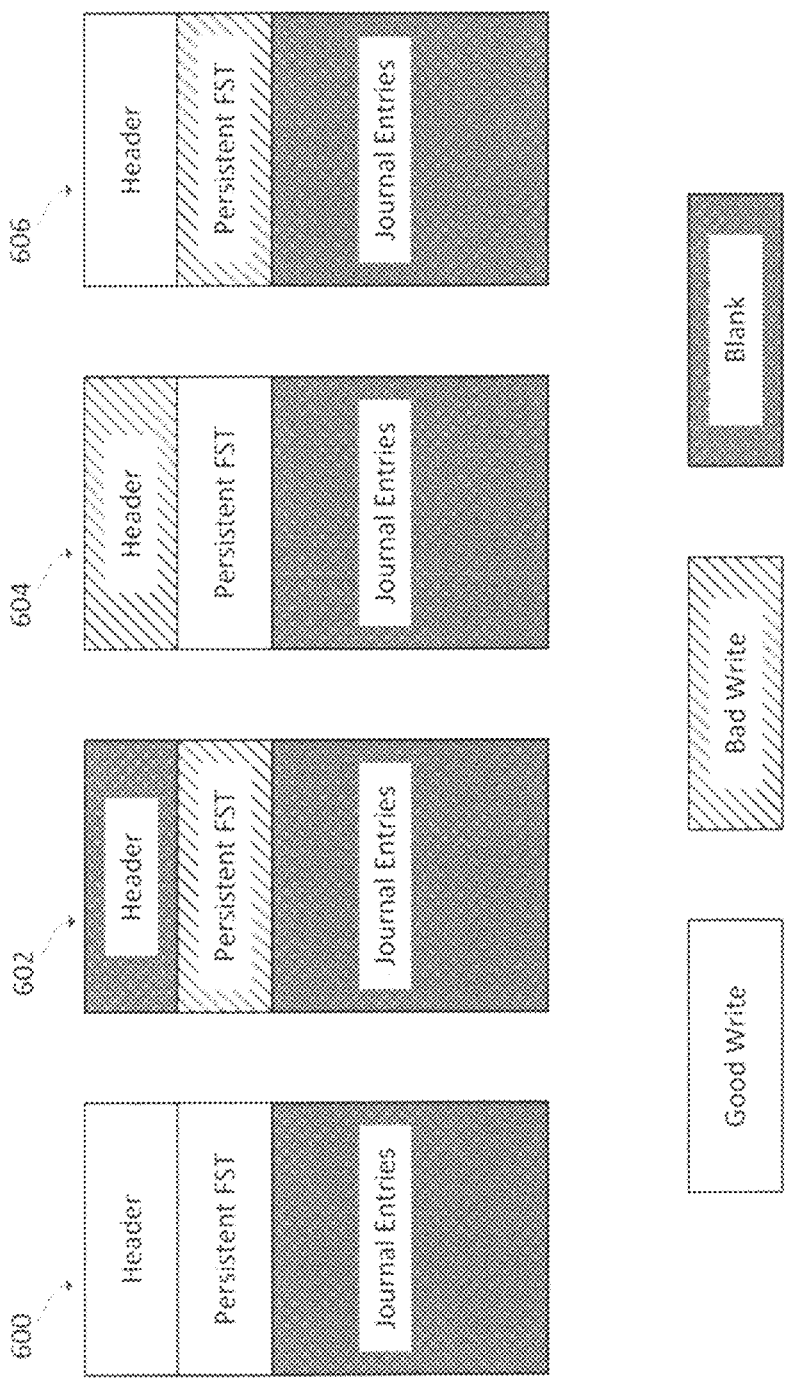
FIG. 6 shows aspects of creating a journal sector, according to one embodiment of the invention.

FIG. 6 shows aspects of creating a journal sector, according to one embodiment of the invention. In one embodiment, when a journal sector is started the persistent FST is written first, with integrity checks, then the journal header is written. Only when the header is valid is the journal sector deemed ready. Then journal entries can be added as needed. When the entries fill up the journal sector, a new journal sector is started with an up-to-date persistent FST. Referring first to valid journal sector 600, both the persistent FST and header have been successfully written and have passed integrity tests (denoted as a "Good Write"). Valid journal sector 600 is now ready to accept journal entries.

In contrast, invalid journal sectors 602, 604, and 606 all have an error (denoted as a "Bad Write") and are not ready for journal entries. Invalid journal sector 602 encountered an error during writing of the persistent FST, such as a power failure. As the persistent FST is written first when a new journal sector is created, the error encountered when writing the persistent FST means that the header is not yet written (denoted as "Blank"). Invalid journal sector 604 successfully wrote the persistent FST, but encountered an error when writing the header. Finally, invalid journal sector 606 has a valid header, but an error in the persistent FST. In this instance, the persistent FST was valid as written, however a serious error has occurred during operation of the SSD (for example, bits in the persistent FST may have flipped in storage, or data was overwritten due to a bug).

Figure 7:
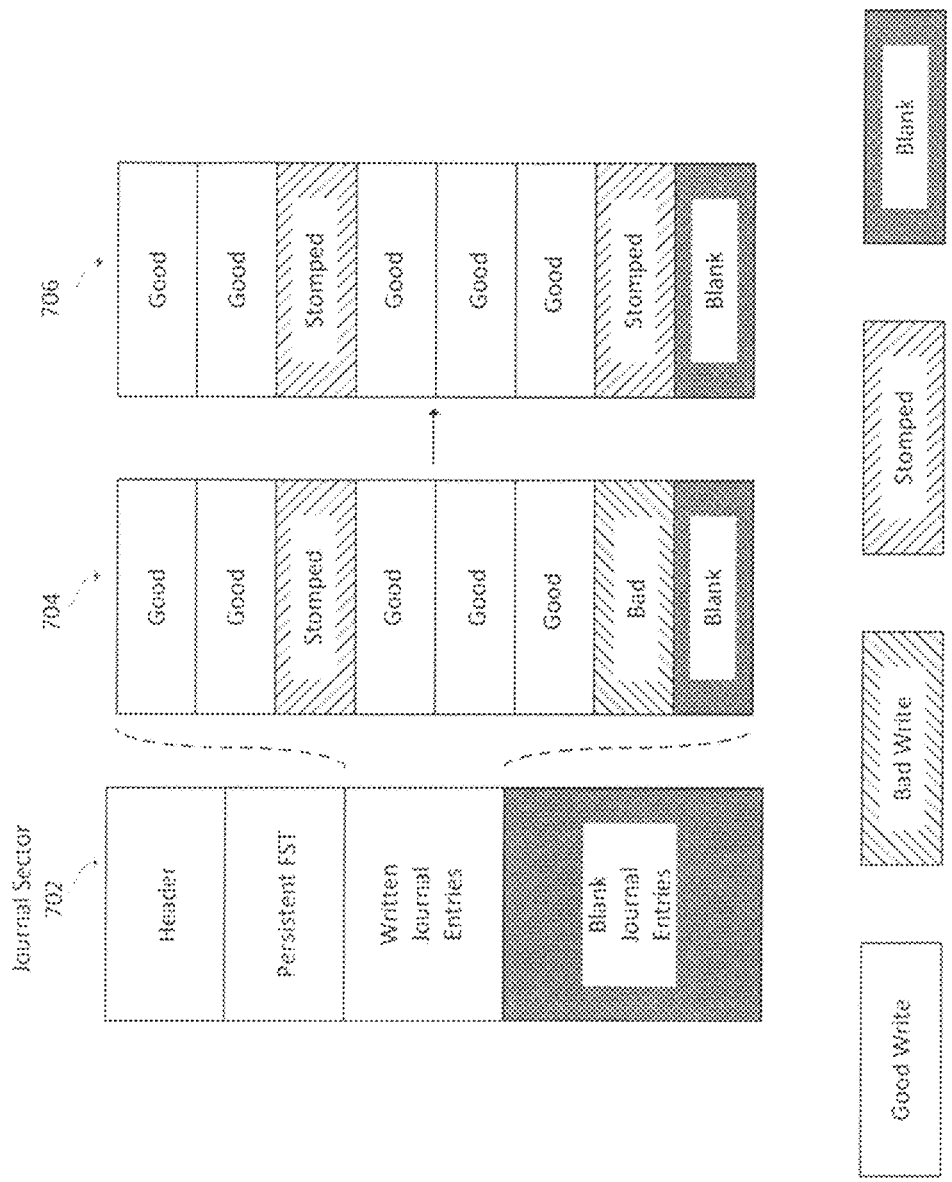
FIG. 7 shows aspects of error handling for an invalid journal entry, according to one embodiment of the invention.

FIG. 7 shows aspects of error handling for an invalid journal entry, according to one embodiment of the invention. Again, a journal sector 702 comprises a header, a persistent copy of the FST, written journal entries, and blank journal entries that have yet to be written. Each journal entry represents a specific change to the maintained state in the persistent copy of the FST. The journal entries are processed in order. "Good" entries (good CRC check) are applied to the persistent FST. A "stomped" entry is an entry that is all zeroes and is deemed to have been a bad entry. A bad entry (bad CRC check), as the last entry, is deemed to have been a journal entry write that was interrupted by power loss or other failure event. As stomped entries have all zeros, they will have no effect on the persistent FST. A blank journal entry (all ones) is the end of the journal entries and where the next journal entry will be added.

As shown in FIG. 7, journal sector 702 has written journal entries 704 containing a bad journal entry as the most recent journal entry, and an interior stomped entry representing an earlier bad journal entry that was subsequently stomped (written as all zeros). The remainder of the written entries are good entries. After detecting the most recent bad journal entry, the bad journal entry is stomped as represented in written journal entries 706, and the next blank journal entry is ready to be written.

Taken together, the data structures of the atomic update file system may be used to atomically update the SPI flash. Consider, for example, a target file Fx stored in the SPI flash that consists of multiple file sectors FS0 to FS4. Now consider an update to three of those sectors, the update sectors are US3 to US5. For the update, two existing file sectors will be overwritten, FS3 and FS4, and one sector will be added, FS5. The objective is to atomically update Fx. If everything goes well, the new image of file Fx will be FS0, FS1, FS2, new FS3, new FS4, and a new and allocated FS5. In an atomic update, the update is conducted such that an error or an interruption (such as power loss) will leave the current image, FS0 to FS4, of the file Fx intact.

In one embodiment, the atomic update file system allocates pages for the update process using FST entries. First, a physical sector is allocated by finding a free file system table entry. Next, the update file sector content is written to a holding file in the SPI flash. The holding file acts as a staging area for making sure the entire update to Fx is successfully written to the SPI flash before updating Fx. A new journal entry is appended to the latest journal sector indicating that the new file sector has been written to the holding file at the corresponding offset (US3). The run-time copy of the FST is updated with the same information. The process is repeated for the other update pages US4 and US5.

After US3 to US5 are successfully written to the holding file, a journal record that specifies that file sectors assigned to the holding file are to be moved to file Fx is appended to the journal sector. In other words, the journal record indicates that updates US3 to US5 have been committed to the now updated file Fx. The run-time copy of the FST is updated to reflect the new updated file Fx.

If, during the atomic update process described above, there is a power loss or other failure event, the journal entries will end with sectors of the sector pool assigned to the holding file, indicating that a failure has occurred since no commit entry has been appended indicating a successful write of the update to the holding file. Any entries assigned to the holding file are cleared. Because the original sectors of file Fx are still intact in the file sector pool (any successful writes of the file update prior to the failure event have only been written to the holding file), and because the file system table entries for those pages are still intact (in the form of the persistent FST), the unmodified file Fx is present and the update can be retried. Upon restart after the failure event, the run-time copy of the FST prior to the failure event can be recreated by copying the latest persistent FST in the journal to volatile memory and applying the respective journal entries in sequence.

In this way, even the largest of updates to the firmware or other critical files in the SPI flash that may take a substantial amount of time, can be performed safely without worrying about any power loss or failure event interrupting the update. The atomic update file system thus provides for two possible outcomes. Either the entire update was successfully written to the SPI flash and the update is applied to the firmware or critical files in the SPI flash atomically, or there was a failure event during the writing of the update and the firmware and/or critical files in the SPI flash remain in their previous unmodified and functional state. The operation of the atomic update file system is explained in further detail in connection with FIGS. 8A-D and 9A-C, below.

Figure 8A:
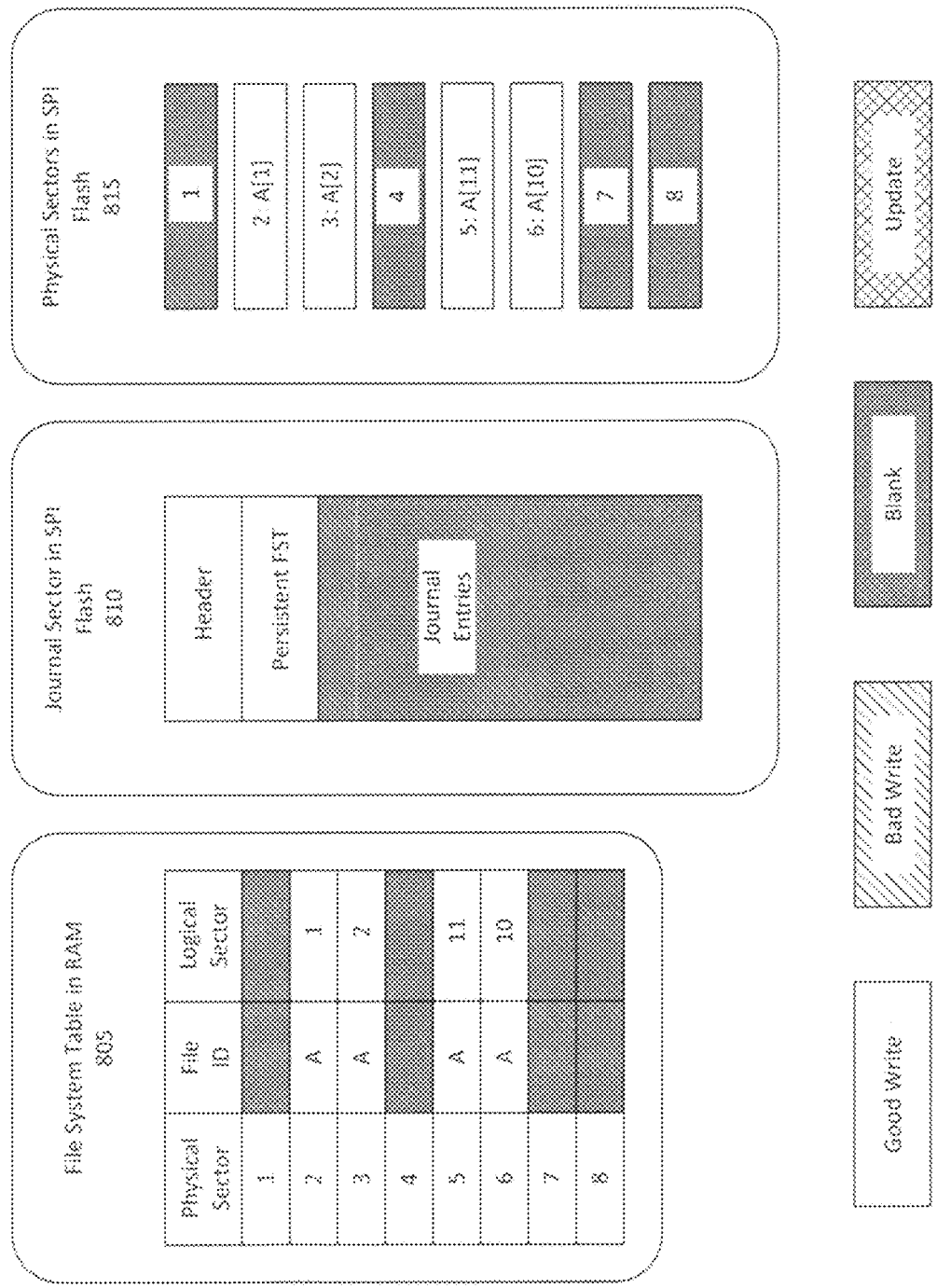
FIGS. 8A-8D shows the steps of a successful atomic update of an auxiliary memory of an SSD, according to one embodiment of the invention.

FIGS. 8A-8D shows the steps of a successful atomic update of an auxiliary memory of an SSD, in accordance with one embodiment of the invention. FIG. 8A shows a steady state of an SSD prior to applying any update to the auxiliary memory. In one embodiment, the auxiliary memory comprises an SPI flash. As shown in FIG. 8A, a run-time copy of the FST 805 is held in RAM. As previously discussed, the FST 805 shows the relationship between the physical sectors in SPI flash, and the file name and logical sector number (of that file) stored in that physical sector. Run-time FST 805 details that file ID "A" is stored in physical sectors 2, 3, 5, and 6 of the SPI flash, along with the corresponding logical sector. The remaining physical sectors, 1, 5, 7, and 8, are blank.

Journal sector 810 is also written in SPI flash, and comprises a header, a persistent copy of the FST, and journal entries. The journal entries are added in increasing time order from top to bottom, each journal entry recording an activity that has been performed in the SPI flash. As there are currently no journal entries in journal sector 810, the persistent FST matches the run-time FST 805. In FIG. 8A, only eight physical sectors are shown as a simplified example. In other embodiments, the number of physical sectors may vary depending on the size of the auxiliary memory and the size of each physical sector within the auxiliary memory.

Figure 8B:
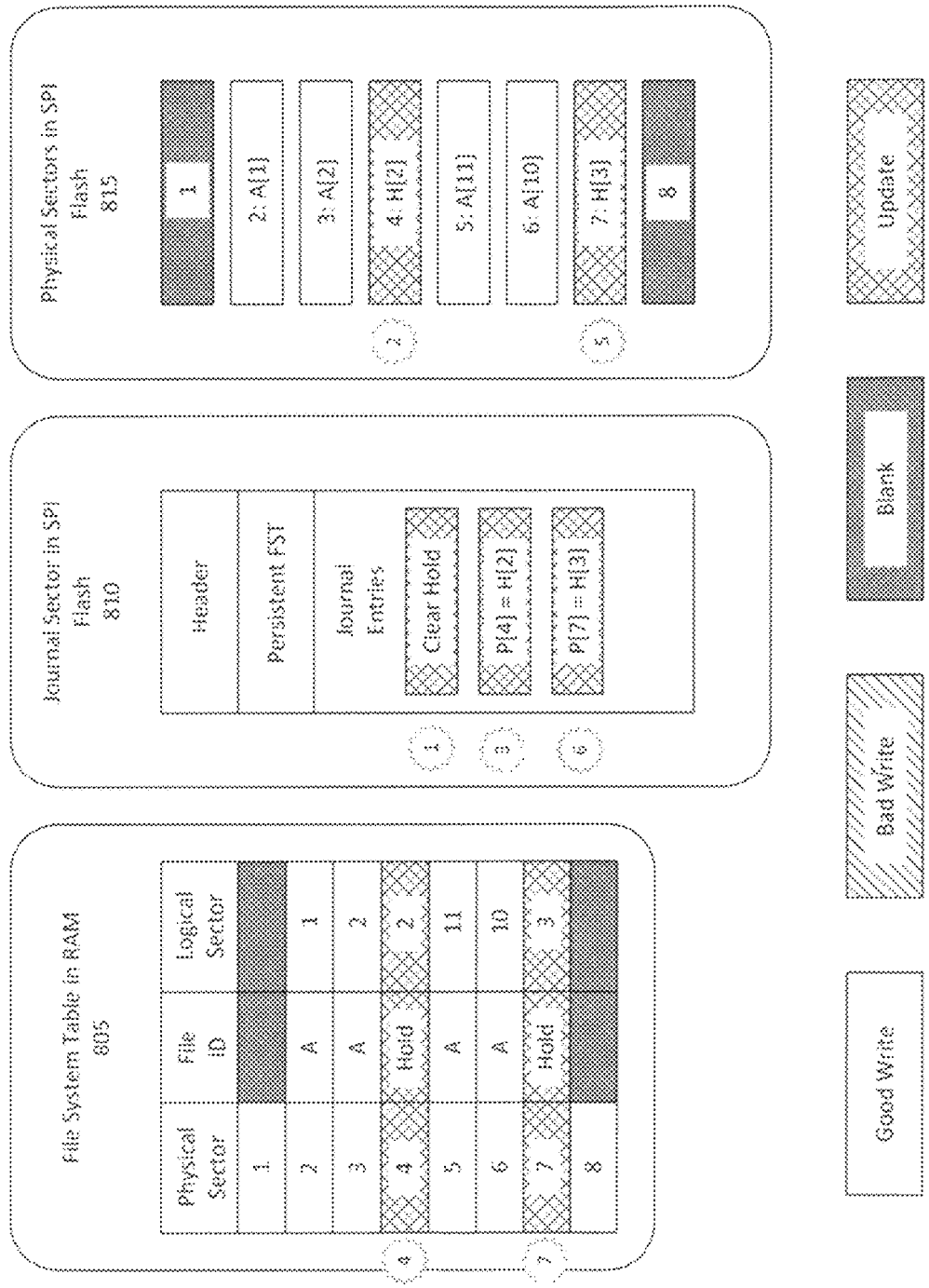

In FIG. 8B, the atomic update file system seeks to update target file A. At step 1, the holding file in the SPI flash is cleared and a journal entry reflecting the holding file is cleared (denoted by "Clear Hold") is appended to the journal sector 810. After the holding file is cleared, at step 2, data is written to physical sector 4 which corresponds to the contents of holding file logical sector 2 (H[2]). At step 3, the journal sector 810 is updated with a journal entry recording the fact that holding file logical sector 2 has been written to physical sector 4 (P[4]=H[2]). Next, at step 4, the run-time FST 805 is updated to reflect the update to physical sector 4 with holding file logical sector 2.

Steps 2-4 are similarly repeated for the update to physical sector 7. At step 5, data is written to physical sector 7 which corresponds to the contents of holding file logical sector 3 (H[3]). At step 6, the journal sector 810 is updated with another journal entry recording the fact that the holding file logical sector 3 has been written to physical sector 7 (P[7]=H[3]). Next, at step 7, the run-time FST 805 is updated to reflect the update to physical sector 7 with holding file logical sector 3.

Figure 8C:
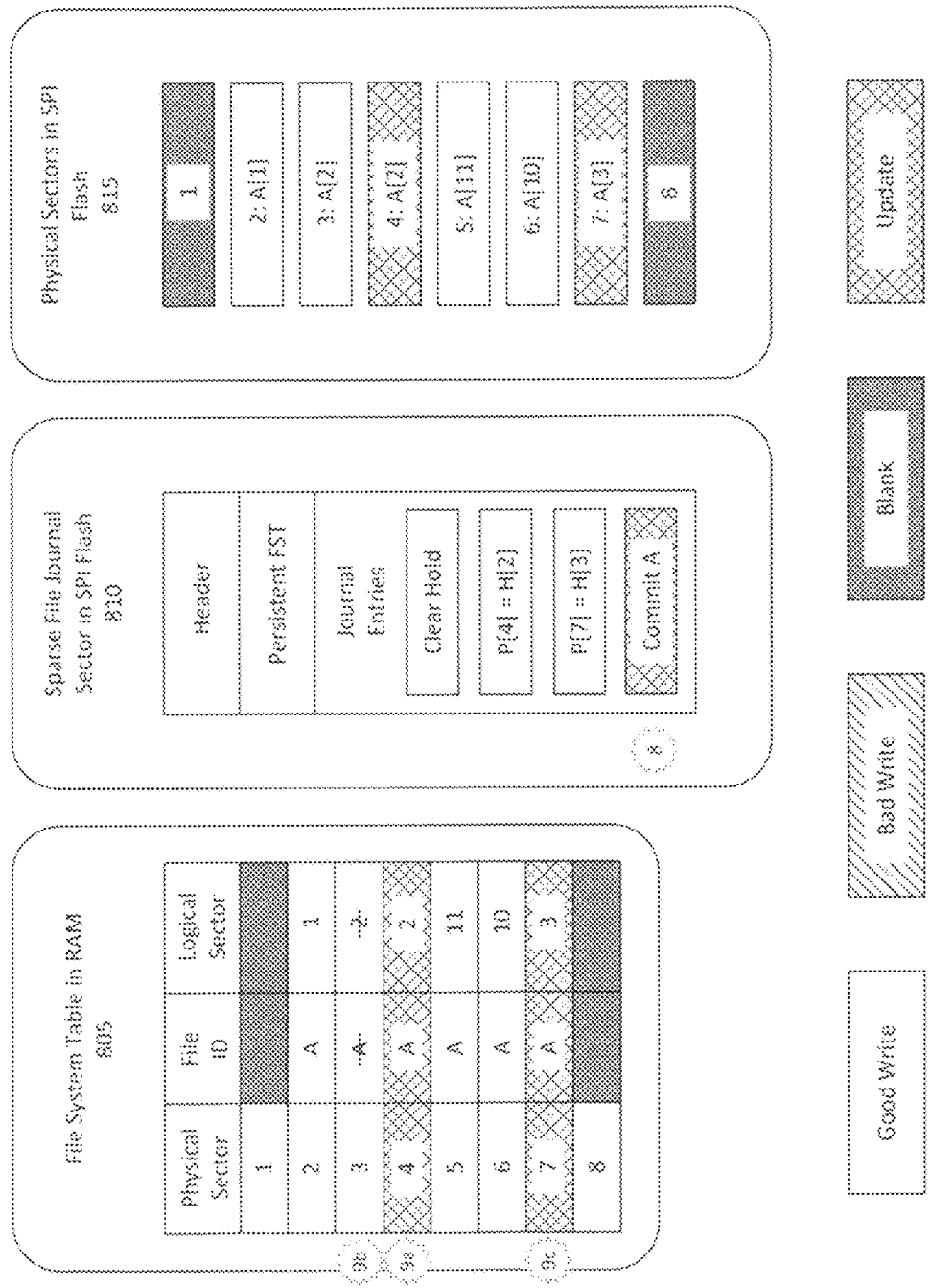

In FIG. 8C, after both physical sectors 4 and 7 have been successfully written with the corresponding holding file logical sectors, file A is ready to be atomically updated. The sectors of the holding file are moved to the target file, A. So H[2] is applied to the target file A at physical sector 4, and H[3] is applied to the target file A at physical sector 7. At step 8, the journal sector 810 records the fact that the update has been committed (denoted by "Commit A") as a new journal entry. At step 9a, the file ID for physical sector 4 is updated from the holding file to target file A in the run-time FST 805. At step 9b, a check is made to see if there is an old entry for the same logical sector 2 for file A in the run-time FST 805. The check detects that there is an old entry at physical sector 3 corresponding to file A logical sector 2, and the entry is cleared. At step 9c, the file ID for physical sector 7 is updated from the holding file to target file A in the run time FST 805.

After the update to target file A has been committed, the run-time FST 805 correctly shows file A's updated logical to physical sector relationships. However, the physical sectors 815 in the SPI flash still retain the old data that was located in sectors that have been updated. As shown in FIG. 8C, physical sector 3 still retains the old contents of logical sector 2 of file A. However, the entry for physical sector 2 in the run-time FST 805 has been cleared at step 9b, so this old data at physical sector 3 will not be accessed when file A is accessed. As such, physical sector 3 is taking up space that could be re-used.

Figure 8D:
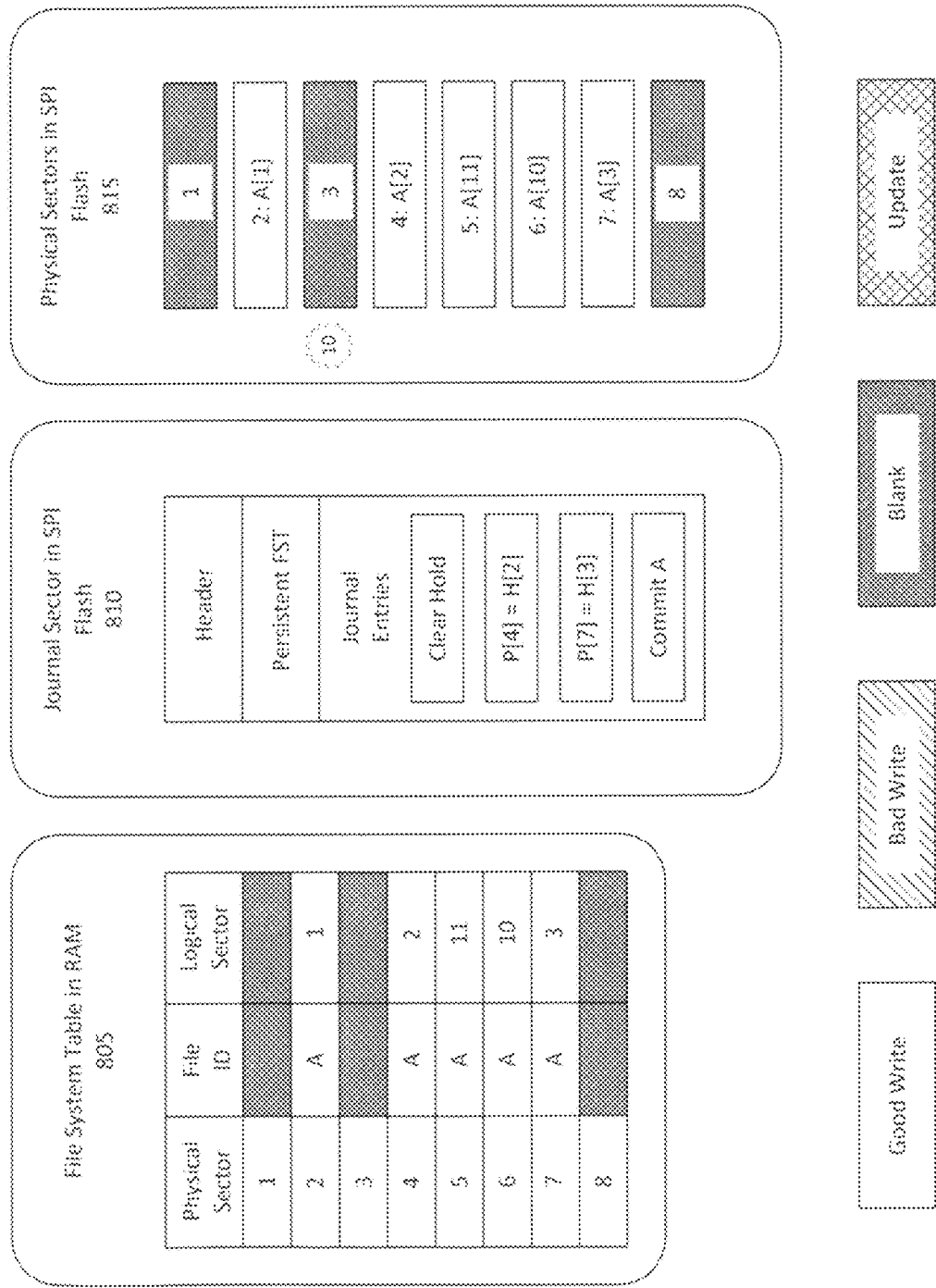

In FIG. 8D, old data that is stored in the physical sectors 815 of the SPI flash are scrubbed. "Scrubbing" is a process that is performed in order to erase any old data in the physical sectors 815 of the SPI flash at is no longer needed. Scrubbing involves traversing through the run-time FST 805 and checking to make sure that for each entry that is clear of file ID and logical sector information, the corresponding physical sector in the SPI flash is blank (erased). If the physical sector holds data, the scrubbing process erases that sector. As shown in FIG. 8D, at step 10, physical sector 3 is scrubbed of the old contents of logical sector 2 of file A and is now blank. In one embodiment, the scrubbing process steps through the physical sectors 815 of the SPI flash when there are no other operations to the SPI flash pending. In this way, the scrubbing process is only performed when the SPI flash is idle, minimizing the impact on the performance of the SPI flash.

Thus, as shown in FIGS. 8A-8D, the atomic update performs an "update first then commit" process. In the commit phase, apart from the journal entry "Commit A" made to the journal sector 810 in the SPI flash, the only other changes that need to be made are entries in the run-time FST 805 in RAM. Changes to the run-time FST 805 can be done quickly after the journal sector 810 is updated in SPI flash. As previously discussed, writing to the SPI flash (measured in 100s of microseconds) is much slower than writing to RAM (measured in 10s of nanoseconds) or other types of persistent memory. Thus, the update first then commit process means that the time to complete the update is perceived to be very fast, even with a large number of actual physical sector changes made to the target file, because only one SPI flash write operation is needed to commit (i.e. the journal entry Commit A) the update which has been previously written to the holding file in the SPI flash.

Figure 9A:
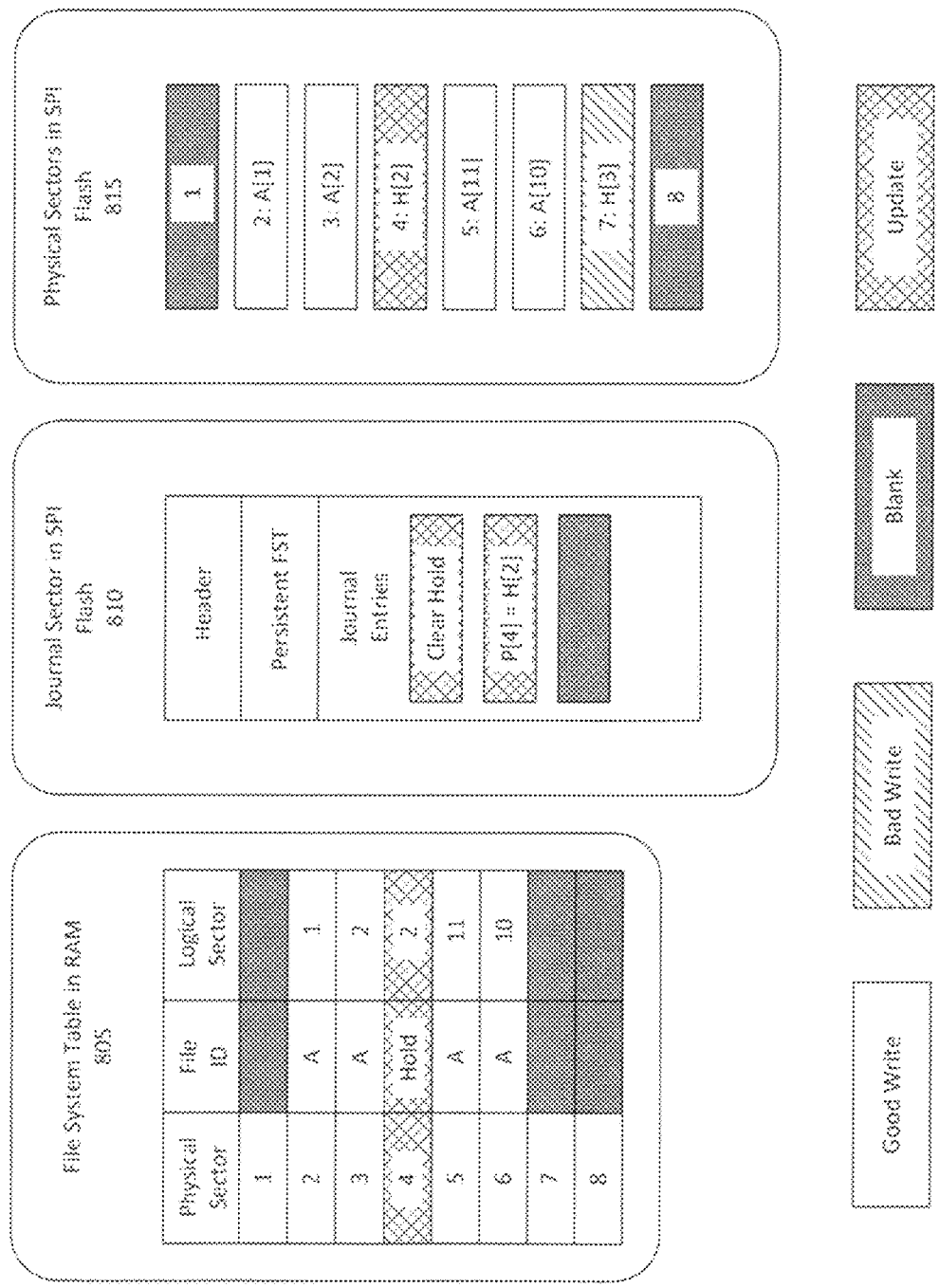
FIGS. 9A-9C shows the steps of an unsuccessful atomic update of an auxiliary memory of an SSD and subsequent recovery, according to one embodiment of the invention.
Figure 9B:
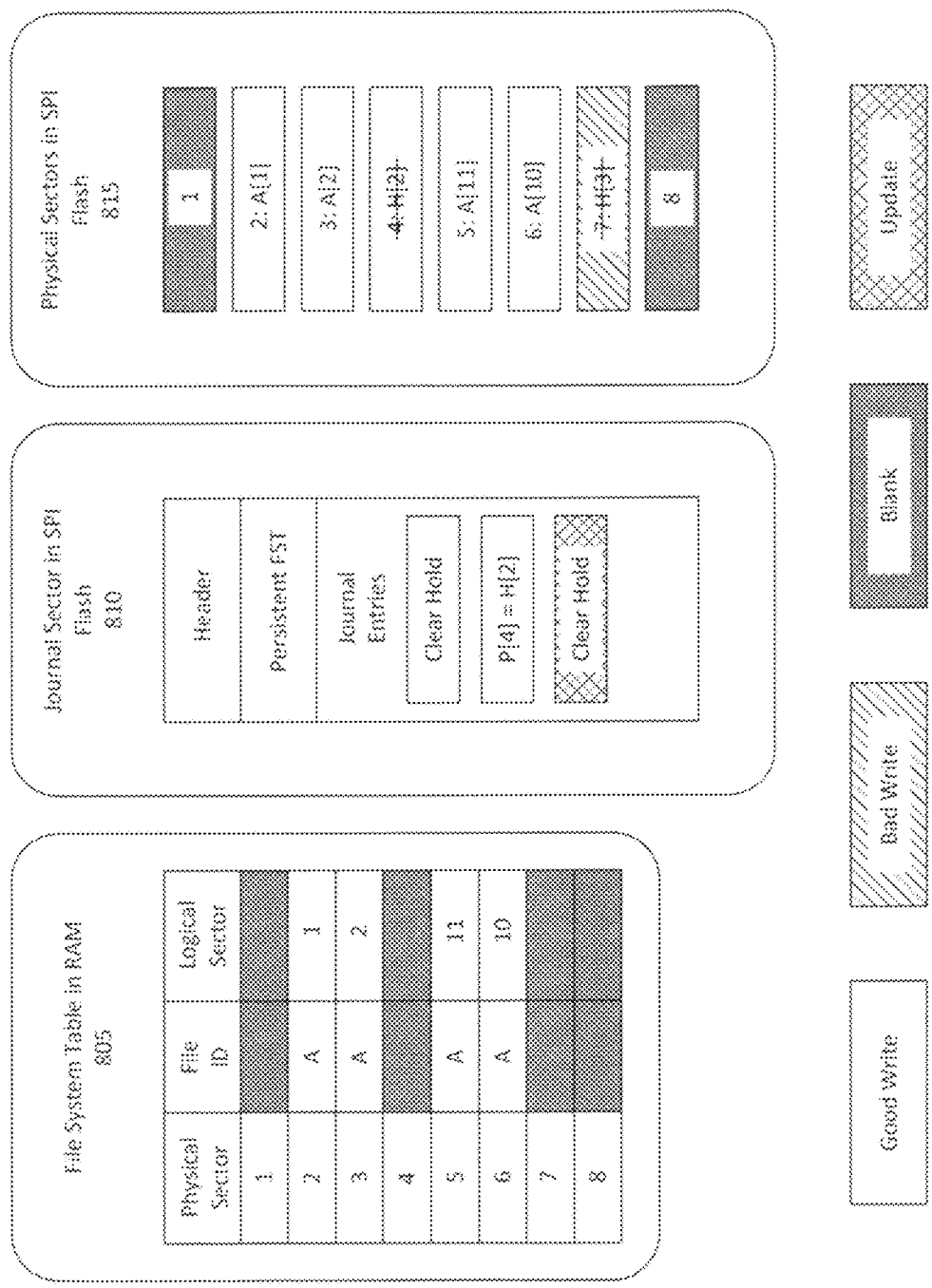
Figure 9C:
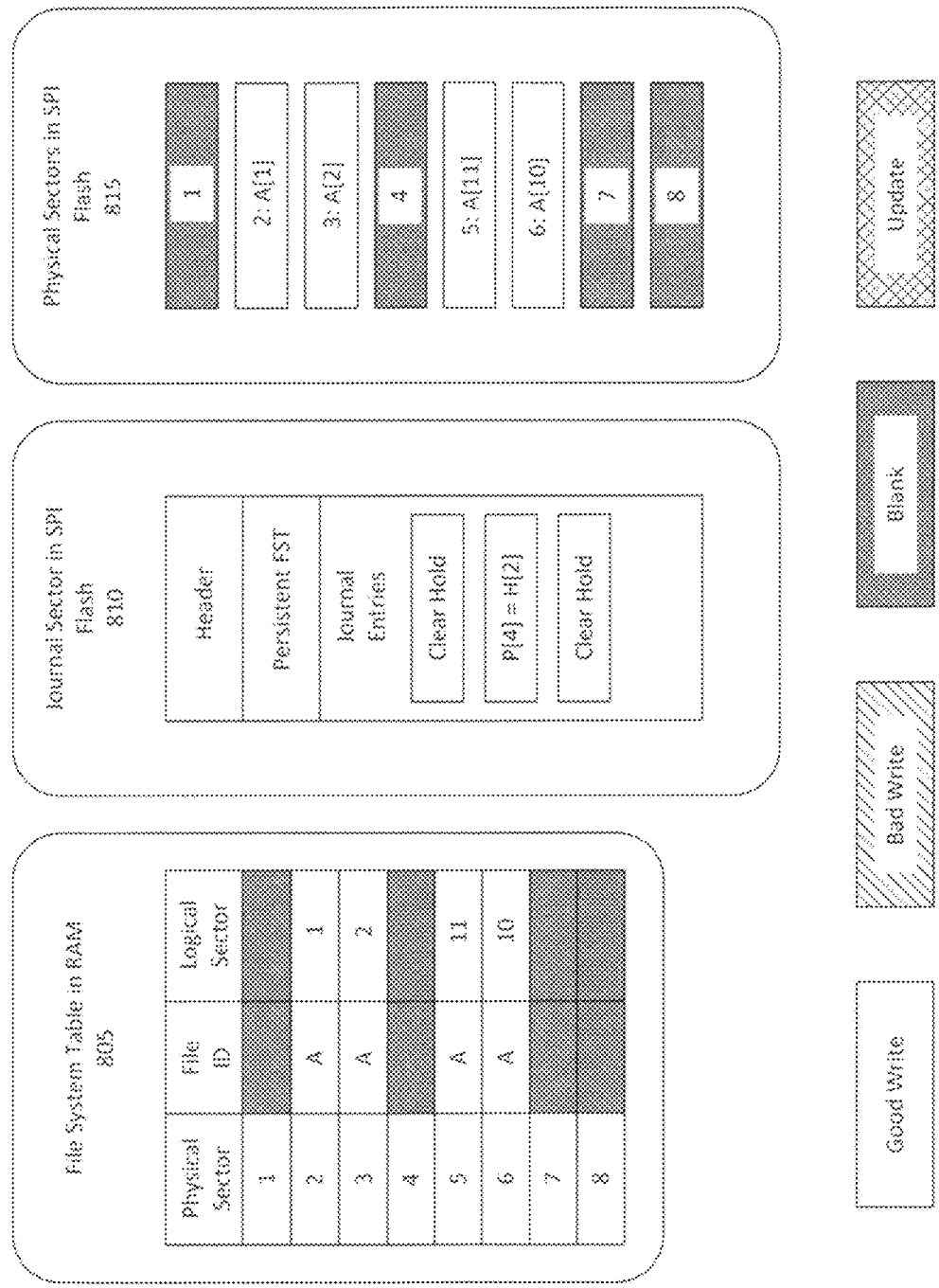

The actual changes to the physical sectors 815 of the SPI flash in the update phase are, however, relatively lengthy operations. This exposes the update phase to a risk that a power failure or other failure event may occur. FIGS. 9A-9C shows the steps of an unsuccessful atomic update of an auxiliary memory of an SSD and subsequent recovery, in accordance with one embodiment of the invention. FIG. 9A corresponds to the atomic update process illustrated in FIG. 8B where a bad write to physical sector 7 has occurred, either due to a power failure or other failure event. Because the holding file has not been successfully written in physical sector 7, there is no corresponding journal entry in the journal sector 810 and no entry in the run-time FST 805.

Upon restart after the power failure or other failure event has been resolved, it will be discovered that there are entries in the journal that have not been finished with a commit, indicating that the update of the target file A in the SPI flash has failed. In FIG. 9B, the holding file is cleared and the journal sector 810 is updated with a clear hold journal entry. In FIG. 9C, a scrubbing process will detect that physical sectors 4 and 7 are empty in the run-time FST 805, and will clear both the good write in physical sector 4 and the bad write in physical sector 7 corresponding to the failed update attempt of target file A. As shown in FIG. 9C, file A in the physical sectors 815 in SPI flash and corresponding run-time FST 805 remain intact (in the same steady state illustrated in FIG. 8A) after recovering from a failed atomic update attempt. As a result, the SSD remains in a functional steady state and the update to file A can be retried.

While the atomic update examples shown in FIGS. 8A-8D and 9A-9C only involve updates to two physical sectors for the sake of brevity, it should be understood that the atomic update process detailed in FIGS. 8A-8D and 9A-9C can be similarly applied to arbitrarily large updates to files in the SPI flash or other auxiliary memory containing firmware or other critical parameters for a flash controller in an SSD.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A solid state drive (SSD), comprising:
   a flash controller;
   a flash memory array in communication with the flash controller; and
   an auxiliary memory in communication with the flash controller from which the flash controller is configured to access files stored in the auxiliary memory, wherein the SSD is configured to update a file in a pending state in the auxiliary memory and access a resulting updated file only when the update has been completed.

2. The SSD of claim 1, wherein an update comprises one or more writes to a holding file in the auxiliary memory.

3. The SSD of claim 2, wherein the SSD is configured to apply the update to a target file to be updated in the auxiliary memory when each of the one or more writes has been written to the holding file, and to reset the holding file when less than all of the sequence of one or more writes have been written to the holding file.

4. The SSD of claim 1, wherein the flash controller is configured to update files in the auxiliary memory.

5. The SSD of claim 1, wherein the auxiliary memory is coarse-grained.

6. The SSD of claim 1, wherein the auxiliary memory comprises a serial peripheral interface (SPI) flash memory.

7. The SSD of claim 2, wherein the one or more writes to the holding file are coarse-grained.

8. The SSD of claim 7, wherein each of the one or more writes comprises at least 100 bytes.

9. A method of updating a file in a solid state drive (SSD), the method comprising:
   performing one or more writes to a holding file in an auxiliary memory, the one or more writes corresponding to an update for a target file in the auxiliary memory;
   applying the update to the target file in the auxiliary memory when each of the one or more writes has been successfully written to the holding file; and
   resetting the holding file when less than all of the one or more writes have been successfully written to the holding file.

10. The method of claim 9, wherein a flash controller in communication with the auxiliary memory performs the one or more writes corresponding to the update for the target file in the auxiliary memory, applies the update to the target file when each of the one or more writes has been written successfully to the holding file, and resets the holding file when less than all of the sequence of one or more writes have been written to the holding file.

11. The method of claim 9, further comprising:
    resetting the holding file prior to performing the one or more writes corresponding to the update for the target file in the auxiliary memory.

12. The method of claim 9, further comprising:
    updating a journal with a new journal entry after each successful write of the one or more writes to the holding file, the new journal entry recording the preceding successful write to the holding file; and
    updating an entry in a file system table comprising an up-to-date record of files stored in the auxiliary memory after each new journal entry, the entry in the file system recording the preceding successful write to the holding file.

13. The method of claim 12, further comprising:
    updating the journal with a commit entry after each of the one or more writes to the holding file has been successfully written to the holding file; and
    updating the file system table entries recording the one or more writes to the holding file to the target file.

14. The method of claim 13, further comprising:
    reallocating the auxiliary memory after the update to the target file is applied.

15. The method of claim 14, wherein reallocating the auxiliary memory comprises traversing one or more sectors of the auxiliary memory and erasing the sectors that correspond to entries in the file system table that are blank.

16. The method of claim 14, wherein the auxiliary memory is reallocated when the auxiliary memory is not being written to or read from.

17. The method of claim 9, wherein the auxiliary memory is coarse-grained.

18. The method of claim 9, wherein the auxiliary memory comprises a serial peripheral interface (SPI) flash memory.

19. The method of claim 9, wherein the one or more writes to the holding file are coarse-grained.

20. The method of claim 19, wherein each of the one or more writes comprises at least 100 bytes.

* * * * *